US005114296A

United States Patent [19]

Badder

[11] Patent Number: 5,114,296

[45] Date of Patent: May 19, 1992

[54] ALL TERRIAN TRANSPORTER BUCKET FOR A FORKLIFT

[76] Inventor: Roland C. Badder, P.O. Box 1343, Woodstock, Ontario, Canada, N4S 8R2

[21] Appl. No.: 597,995

[22] Filed: Oct. 10, 1990

[30] Foreign Application Priority Data

Oct. 30, 1989 [CA] Canada ................................ 2001760

[51] Int. Cl.[5] ................................ B65G 67/02

[52] U.S. Cl. ................................ 414/607; 37/117.5; 414/414; 414/422; 414/642

[58] Field of Search ................ 414/607, 722, 422–425, 414/639–642, 726; 37/117.5, 118 A, 120, DIG. 3

[56] References Cited

U.S. PATENT DOCUMENTS

| | | | |
|---|---|---|---|
| 2,917,196 | 12/1959 | Hastings, Jr. | 414/642 |
| 3,461,968 | 8/1969 | Longley | 37/117.5 X |
| 4,030,626 | 6/1977 | Durham | 37/118 A X |
| 4,051,614 | 10/1977 | Diggs | 37/118 A X |
| 4,239,446 | 12/1980 | Vucinic | 414/607 X |
| 4,334,820 | 6/1982 | Homura | 414/607 |
| 4,405,278 | 9/1983 | Kvalheim | 414/414 X |
| 4,799,852 | 1/1989 | Ramun | 37/117.5 X |

FOREIGN PATENT DOCUMENTS

| | | | |
|---|---|---|---|
| 2931864 | 2/1980 | Fed. Rep. of Germany | 414/607 |
| 3441477 | 5/1986 | Fed. Rep. of Germany | 414/607 |
| 1350108 | 11/1987 | U.S.S.R. | 414/607 |
| 2135962 | 9/1984 | United Kingdom | 414/607 |

*Primary Examiner*—David A. Bucci

[57] ABSTRACT

An assembly detachably mountable on the forks of a fork-lift vehicle includes a frame having channels open at one end thereof for insertion thereinto of respective ones of the forks of a fork-lift vehicle. A bucket having a bottom wall and an open front wall is tiltably attached to the frame for movement from one to the other of load holding and load dumping positions. Located at the open front wall of the bucket is a door movably mounted thereon, which is movable to open and close the open front wall. The assembly also includes power units which can selectively move the bucket relative to the frame and open and close the door. The assembly can be used with a conventional fork-lift vehicle to scoop up particulate material from a surface, and carry the material to another location where it can be dumped from the assembly.

11 Claims, 3 Drawing Sheets

ALL TERRIAN TRANSPORTER BUCKET FOR A FORKLIFT

FIELD OF INVENTION

The present invention relates to a novel device for use in combination with a fork-lift truck for removing, transporting and loading particulate material.

One application of the invention is in the removal of common particulate material such as snow or sand. The device may be used, for example, to scrape the material from a surface, and to transport same to another location where the material may be dumped.

BACKGROUND OF INVENTION

Various devices are known for use in removing, transporting and dumping particulate and other materials. Perhaps best known is the crane or steam shovel having a bucket comprised of movable jaw members. On a somewhat smaller scale is the backhoe, which is typically used, as is the crane, where excavation is required.

Where it is required to remove, transport and dump a particulate material such as snow or sand, each of the aforementioned devices suffers from a number of drawbacks. Firstly, such devices are typically adapted for the removal of material which is ordinarily in an agglomerated state, such as earth or clay. Secondly, such machinery is ordinarily expensive and complex in its structure and operation. Finally, the size of such equipment precludes its use in locations of restricted area and/or space.

The present invention overcomes the foregoing disadvantages providing a novel device which can be used in combination with an ordinary fork-lift vehicle to remove, transport and dump, chunk, granular, particulate and the like material such as snow, sand, grain etc. The device is relatively inexpensive and simple in its structure and operation, and because it is used in combination with an ordinary fork-lift truck it can be used in locations where area and/or space is restricted.

Several devices are known in the field to which the present invention pertains, however each suffers from at least one disadvantage when compared with a device of the invention disclosed herein.

For example, U.S. Pat. No. 3,877,593 to Sleziak discloses a dumping device for use with a fork-lift truck. However, unlike a device of the present invention, the device disclosed by Sleziak must be used in combination with a fork-lift truck having lifting masts which are pivotable. U.S. Pat. No. 3,270,900 to Sherman discloses an automatic bin dumping apparatus which can be used in combination with a fork-lift truck to dump material from a bin mounted on the truck into a receptacle. However, unlike a device of the present invention, the device disclosed by Sherman cannot be used in combination with a fork-lift truck to remove particulate material from a surface. U.S. Pat. No. 4,334,820 to Homura discloses a bucket system including tilting means for use with a fork-lift truck which incorporates a pair of cables. However, unlike Homura's device, in which the bucket automatically tilts when the forks are raised, the present device includes a bucket which can be tilted to unload the material therefrom, by dumping it for example into a receptacle, with the bucket at any height. Finally, U.S. Pat. No. 4,405,278 to Kvalheim discloses a self-emptying box, which unlike a device of the present invention, requires a specially adapted receptacle into which the load must be dumped.

SUMMARY OF THE INVENTION

The present invention relates to an assembly detachably mountable on the forks of a fork-lift vehicle. The assembly includes a frame having channels open at one end thereof for insertion thereinto of respective ones of the forks of the fork-lift vehicle and means for detachably anchoring the frame to at least one of the forks. The assembly also includes a bucket, having a bottom wall and an open front wall, tiltably attached to the frame for movement from one to the other of a first position wherein the bottom wall engages the frame and a second position wherein the bottom wall is spaced from and inclined relative to the frame. The assembly also includes a door movably mounted on the bucket and located at the open front wall, the door being movable respectively to open and close the open wall. The assembly also includes power means selectively to move the bucket relative to the frame and to open and close the door.

The bucket is pivotally mounted on the frame, or is pivotally connected to the frame at a position remote from the fork-lift vehicle. The bottom wall of the bucket includes at least one pop-out panel portion located at a position overlying each of the channels in proximity of the connection between the bucket and the frame when the bucket is in the first position. The leading edge of the bottom wall, adjacent the open front wall of the bucket, is wedge-shaped.

The power means comprises a power unit, for example at least one hydraulic jack. Alternatively, the power means comprises at least one first power unit for moving the bucket from one to the other of the first position and the second position, and at least one second power unit for opening and closing the door, and each of the power units can comprise a hydraulic jack.

In another aspect of the invention, the assembly for use with a fork-lift vehicle comprises in combination a frame detachably mountable on at least one fork of the fork-lift vehicle, a bucket, having a floor and an open front wall, movably mounted on the frame and movable within selected limits from one to other of a first load holding position and a second load dumping position, a door movably mounted on the bucket and located at the front wall, which includes at least one arm extending therefrom and connected to the bucket, movable within selected limits from one to the other of respective door closed and door open positions, and power means selectively to move the bucket relative to the frame and to open and close the door. The power means comprises a first hydraulic power unit connected to the bucket and to the frame for moving the bucket from one to the other of the first load holding and second load dumping positions, and a second hydraulic power unit connected to the door and to the bucket for moving the door from one to the other of the door closed and door open positions. The floor of the bucket includes at least one pop-out panel portion located in proximity of the location at which the bucket is movably mounted on the frame and adjacent each of the channels when the bucket is in the first load holding position.

In a further aspect of the invention, there is provided in a bucket for use on a motorized vehicle wherein the bucket includes an open front wall and a flat plate-like rigid bottom wall, and pivot means on the underside of the bottom wall for pivotally attaching the bottom wall to a beam-like member that is cantilevered forwardly from the vehicle and underlies in abutting relation the bottom wall when the bucket is in a load carrying position and is spaced therefrom when the bucket is pivoted to a tilted load dumping position, the improvement comprising a pop-out panel portion, in the bottom wall, located over the beam-like member in proximity of the pivot means that is displaced in response to pressure exerted by debris lodged between the beam-like member and the bottom wall of the bucket.

LIST OF DRAWINGS

The invention, is illustrated by way of example in the accompanying drawings wherein.

Figure 1:
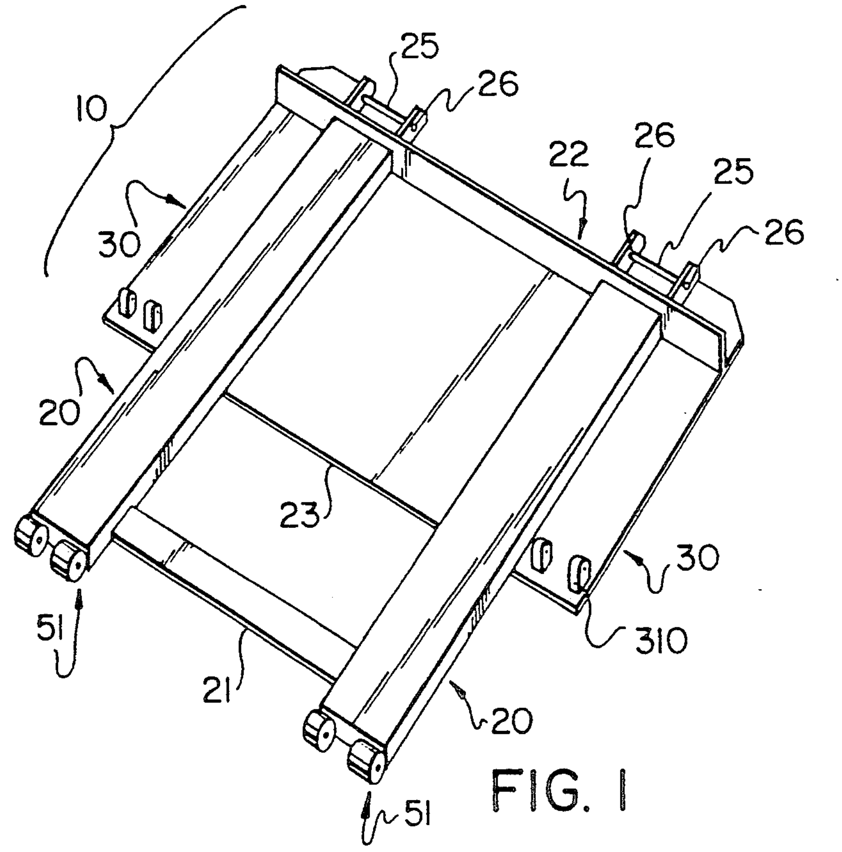
FIG. 1 is a perspective view of the frame portion of an assembly provided in accordance with the invention.

DETAILED DESCRIPTION OF PREFERRED EMBODIMENTS:

Referring to FIG. 1 of the drawings, illustrated in perspective view is a frame 10 of a frame and bucket assembly provided in accordance with the present invention. Frame 10 is comprised of a pair of channels 20 joined by a front cross-member 21, a center plate 23 and a rear cross-member 22. Extending outwardly from and along the outside of each of channels 20 is a side portion 30 which includes mounting pegs 310 of plate 23. Each of the cross-members and plate heretofore described connect each channel 20 to the other and impart stability to frame 10.

Each channel 20 is open at one end to receive a fork of a fork-lift vehicle. The open end of each channel 20 includes apertures 26 that receive a removable retaining pin 25. Retaining pin 25 is inserted through the open end of channel 20 as illustrated in FIG. 1, after the horizontal portion of a fork of a fork-lift vehicle has been inserted into channel 20, to retain the horizontal portion of the fork in the channel. The relationship of channel 20, retaining pin 25 and the horizontal portion 100A of a fork 100 is illustrated in FIGS. 4, 5 and 6, which are side views of an assembly of the device.

Figure 4:
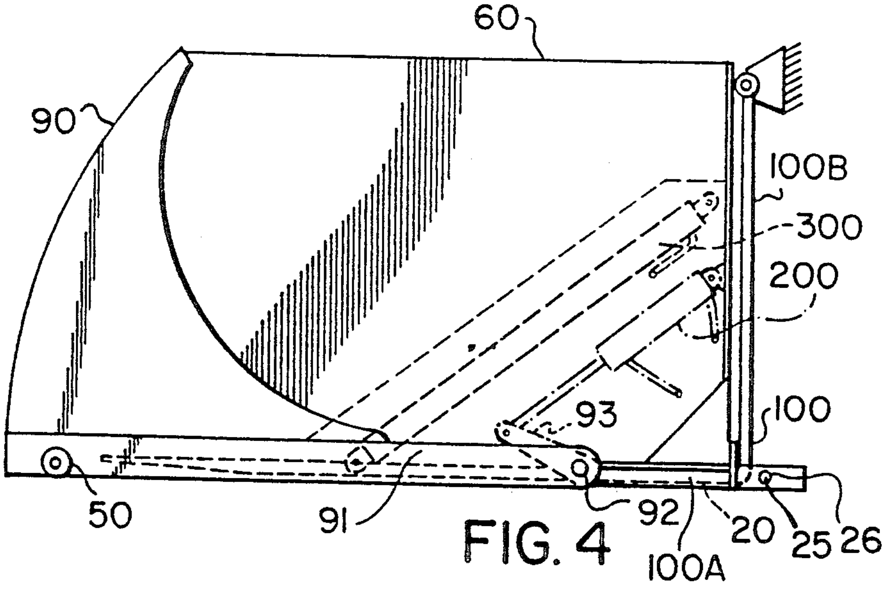
FIG. 4 is a side view of a frame and bucket assembly provided in accordance with the invention with the bucket in a first load holding position and having the door closed.
Figure 5:
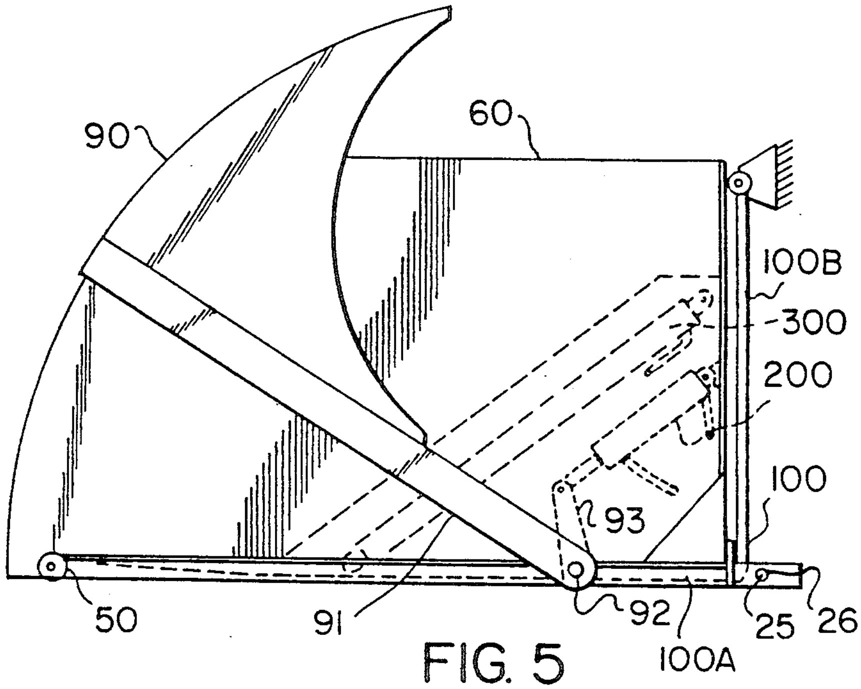
FIG. 5 is a side view, similar to FIG. 4 but with the door open.
Figure 6:
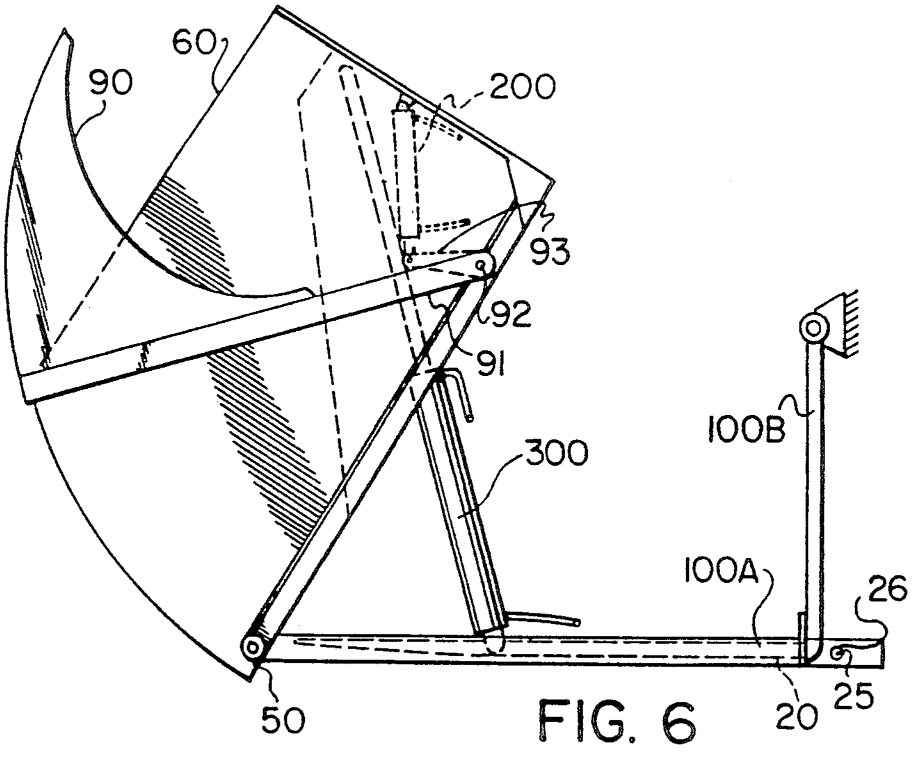
FIG. 6 is a side view, with the bucket in a second, tilted, load dumping position and with the door open.

At the end of each channel 20, remote from the end having apertures 26, there is, as illustrated in FIG. 1, a hinge element 51, which forms part of a pivotable connection 50 between frame 10 and a bucket 60 as illustrated in FIGS. 4, 5 and 6.

Figure 2:
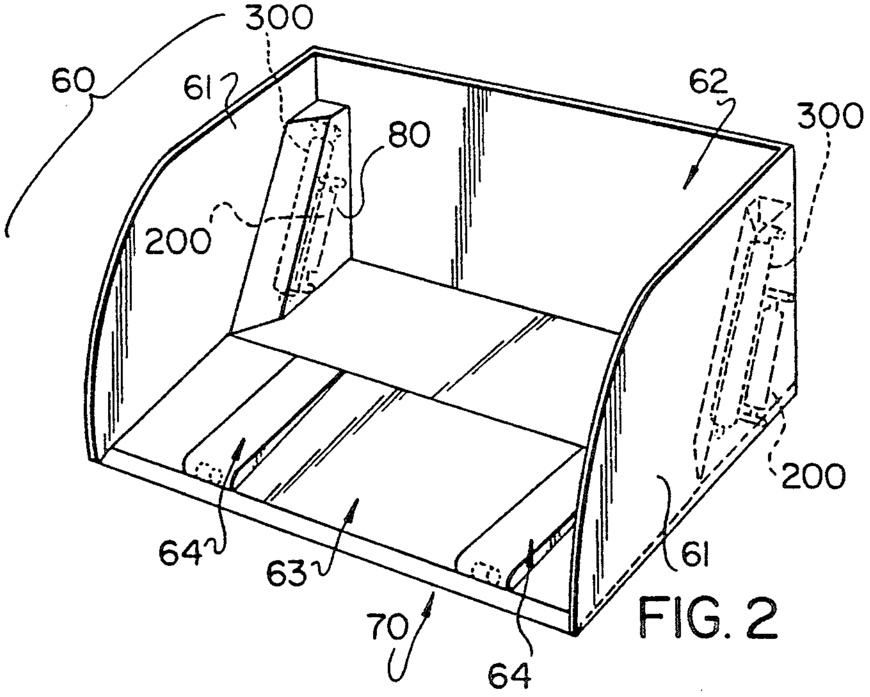
FIG. 2 is a perspective view of the bucket portion of an assembly provided in accordance with the invention.

Bucket 60, which in the preferred embodiment of the invention is pivotally connected to each channel 20 of frame 10 at pivotable connection 50, is illustrated in perspective view in FIG. 2 of the drawings. Referring to FIG. 2, there is illustrated a bucket 60 which includes a pair of parallel spaced side walls 61, a rear wall 62, a floor 63 and an open front area for loading the bucket. Floor 63 of the bucket is pivotally connected to frame 10 at each pivotable connection 50, remote from the fork-lift vehicle. Fixed to and extending from the forward edge of floor 63 adjacent the open front wall of bucket 60 is a leading edge 70 which is wedge-shaped tapering away from bucket 60. In addition to assisting in the scraping of material being loaded into bucket 60, leading edge 70 also protects each pivotable connection 50 and the ends of channels 20 remote from the fork-lift vehicle. As also illustrated in FIG. 2, adjacent and attached to each of side walls 61, inside bucket 60, is an enclosure 80 adjacent and attached to rear wall 62 of the bucket. As further described below, enclosure 80 is provided to accommodate and protect means for moving bucket 60 about pivotable connections 50.

Floor 63 of the bucket includes a pair of detachable shiver plates 64, each of which is located adjacent to a pivotable connection 50. Each panel portion 64 extends inwardly from leading edge along floor 63 for about half the depth of floor 63 and is also located above each channel 20 of frame 10 underlying the bucket and each shiver plate is attached to the floor and leading edge. Upon the exertion of a threshold amount of upward pressure from beneath pop-out panel portion 64, the panel portion will detach and separate from floor 63 of the bucket.

The bucket includes a door which is movable between a door opened position and door closed position. In the door closed position the door encloses the open front wall of bucket 60 and in the door open position the door is raised to a position above the bucket.

Figure 3:
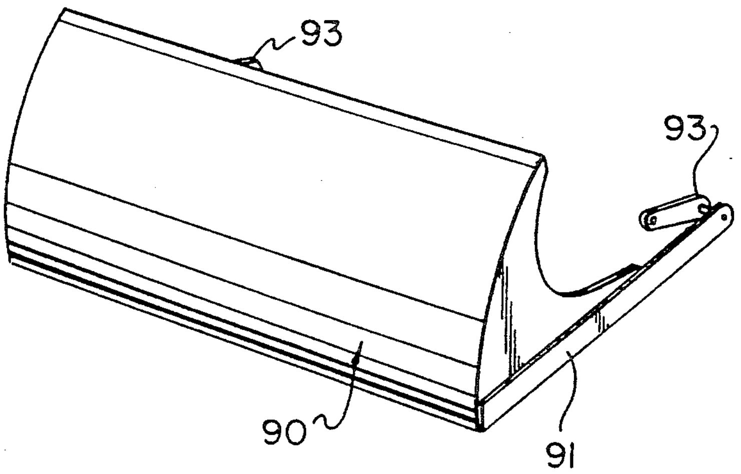
FIG. 3 is a perspective view of a door for the bucket.

Referring to FIG. 3 of the drawings, there is illustrated in perspective view a bucket door 90 having a pair of door arms 91 extending therefrom. A lever 93 and pivot pin 92 is fixedly secured to the end of each door arm 91 as illustrated. The door arms 91 are pivotally attached to respective ones of opposite side walls 61 of bucket 60 by pivot pins 92, one of which is illustrated in FIGS. 4, 5 and 6.

As also illustrated in FIGS. 4, 5 and 6, the end of each lever 93 remote from door arm 91 is pivotally connected to the lower end of a door operating hydraulic unit 200 (illustrated in a broken line) located within housing 80. The upper end of door operated hydraulic cylinder 200 is pivotally connected to the rear wall 62 of bucket 60.

Located above door operating hydraulic unit 200 and also within enclosure 80 is a bucket tilting hydraulic cylinder 300, also illustrated in broken line in FIGS. 4, 5 and 6. Bucket tilting hydraulic unit 300 is at its upper end also pivotally connected to the topmost portion of rear wall 62 of bucket 60, and at its lower end is pivotally connected to mounting pegs 310 located at midway point between each end of channel on side portion 30 of plate 23 as illustrated in FIG. 1. The location of each door operating hydraulic unit 200 and bucket tilting hydraulic unit 300 within an enclosure 80 of bucket 60 is illustrated in perspective view in FIG. 2 of the drawings.

Door operating hydraulic unit 200 is illustrated in an extended condition (bucket door closed position) in FIG. 4 of the drawings, and in a retracted condition (bucket door open position) in FIGS. 5 and 6 of the drawings. Door operating hydraulic unit 200 may be activated to move door 90 between a bucket door closed position and a bucket door opened position. Bucket tilting hydraulic unit 300 is illustrated in a retracted condition (bucket lowered position) in FIGS. 4 and 5 of the drawings, and in an extended condition (bucket raised position) in FIG. 6 of the drawings. Bucket tilting hydraulic unit 300 can be activated to move the bucket between a bucket load holding position and a bucket tilt unloading position.

With the assembly resting on a surface such as a floor, a fork-lift vehicle, under the control of an operator, can approach the assembly, with the forks of the vehicle in a lowered position. The vehicle is steered during movement so as to direct the tip end of the forks toward the open ends of channels 20 adjacent rear wall 62 of the assembly. The operator of the fork-lift then drives the vehicle further causing the horizontal portions of the forks to move completely into respective ones of the pair of channels and the vertical portions to be adjacent rear wall. The assembly is anchored in position by inserting removable retaining pins 25 into apertures 26 in the channels at a position behind the vertical portions 100B of the forks.

With the assembly thus secured to the fork-lift, the operator may then raise the forks and attached assembly, and maneuver the vehicle to the location of the material to be loaded into the bucket.

At the location of the material, the operator can then lower the forks to ground level, and by manipulating an appropriate control system, door operating hydraulic units 200 may be activated (i.e. retracted) to open door 90 of bucket 60. With the door open, the operator can then drive the fork-lift vehicle and attached assembly forward into the material. As the vehicle advances, material is scraped and guided by leading edge 70 into bucket 60. The advance of the vehicle may be stopped once bucket 60 has been loaded with material.

Depending upon the nature of the material, door 90 may be lowered, and forks 100 and attached assembly raised, following which the loaded vehicle may retreat from the material. Alternatively, forks 100 and the assembly may be raised, and then door 90 closed, followed by retreat of the vehicle, or, the retreat of the vehicle can, if desired, precede the closing of door 90 and raising of forks 100 and the attached assembly.

With door 90 closed and a load of material in bucket 60, forks 100 and the attached assembly may be raised to the desired height, and the loaded vehicle then driven to another location for unloading.

Upon arrival at the unloading site, the loaded assembly with door 90 in the closed position may be positioned at an appropriate height for dumping by manipulating the horizontal position of forks 100. Thereafter, door 90 of the bucket assembly may be moved to its raised position. Prior to, simultaneous with, or following, the raising of door 90 as aforesaid, by manipulating a second appropriate control system to activate bucket tilting hydraulic units 300, bucket 60 may be tilted forwardly about pivotable connection 50. Depending upon the adhesive qualities of the material present in bucket 60, upon opening door 90 and tilting bucket 60 forwardly, substantially all of the material will fall out of bucket 60 by gravity.

After unloading, door 90 may be returned to its closed position, bucket 60 returned to its lowered position, and the forks and assembly repositioned to the desired height for driving the fork-lift vehicle and attached assembly to another location.

During the course of loading or dumping a load of material as aforesaid, some material may come to rest atop one or both of channels 20 of frame 10. This material may become wedged between channel 20 and the underside of bucket 60 upon the return of bucket 60 to its lowered position, with possible damage to the channel members and/or floor of the bucket. For the purpose of avoiding damage, floor 63 is provided with pop-out floor panel portions 64 which are illustrated in FIG. 2 of the drawings. Upon the application of a threshold amount of upward pressure, exerted for example by material located between the underside of bucket 60 and a channel member 20, pop-out panel portion 64 will detach from floor 63. These pop-out panel portions are located above the channels in the vicinity of the connection between the bucket and the frame, and allow the return of bucket 60 to a substantially horizontal position while minimizing the risk of damage to one of the channel members and/or the underside of the bucket due to material lodged therein.

It will be appreciated that the present invention is not limited to the features of the embodiments so described and illustrated, but includes all variations and modifications within the scope of the claims.

The embodiments of the invention in which an exclusive property or privilege is claimed are defined as follows:

1. An assembly mountable on forks of a motorized vehicle comprising:

(a) a frame having a pair of channels open at one end for insertion into respective ones of said forks;

(b) a bucket, having a floor section and fixed leading edge, a pair of parallel spaced side walls, a rear wall and an open front area, movably mounted on said frame and movable within selected limits, from a lowered position to a raised position;

(c) a pair of housings on an inside of said bucket adjacent and attached to the side walls and the rear wall;

(d) a door pivotally attached to the bucket and located at said open front area and movable within selected limits from a door lowered position to a door raised position;

(e) a pair of shiver plates, one overlying each channel when said bucket is in the lowered position;

(f) a first hydraulic cylinder located in at least one of said housings for moving said bucket from a lowered position to a raised position; and (g) a second hydraulic cylinder located in at least one of said housings for moving said door from a lowered position to a raised position.

2. The assembly claimed in claim 1, wherein said channels of said frame are secured one to the other by a centre section and side portions and by a rear cross member and a front cross member.

3. The assembly claimed in claim 1, wherein said frame having side portions extending outwardly from and along the outside of each said channel and each said side portion having mounting pegs located at midway point between each channel end.

4. The assembly claimed in claim 1, wherein the said rear wall is adjacent a vertical portion of said forks after a horizontal portion of said forks has been inserted into said channels.

5. The assembly claimed in claim 1 wherein the fixed leading edge of floor section adjacent the open front area is wedge shaped tapering away from said bucket, whereby said leading edge assists in scraping and loading material into said bucket.

6. The assembly claimed in claim 1, wherein the shiver plates are attached to said floor section and said leading edge, and each extends from said leading edge inwardly for about half a depth of the floor.

7. The assembly claimed in claim 1, wherein said door, having a pair of fixed arms extending therefrom, and a lever and pivot pin secured to each end of said fixed arms remote from said door, said door being pivotally attached at said pivot pin, to respective ones of opposite side walls for movement from a door lowered position to a door raised position.

8. The assembly claimed in claim 7, wherein said door arms are pivotally attached to said side walls at a position remote from said open front area of said bucket and adjacent said floor section of said bucket.

9. The assembly claimed in claim 1, wherein said first hydraulic cylinder is at a lower end pivotally connected to mounting pegs and is at an upper end pivotally connected to a topmost portion of said rear wall.

10. The assembly claimed in claim 1, wherein said second hydraulic cylinder is pivotally connected at a lower end to a door arm lever and at an upper end to said rear wall, at a position lower than said first hydraulic cylinder.

11. An assembly mountable on forks of a motorized vehicle comprising:

(a) a pair of channels open at one end for insertion into respective ones of said forks;

(b) a bucket assembly having a rigid floor, a rear wall, side wall, and an open front area and being movable between a lowered position and a raised position;

(c) wherein said rear wall is adjacent a vertical portion of said fork after a horizontal portion of said fork has been inserted into said channel;

(d) a pair of detachable shiver plates, one overlying each said channel when bucket is in said lowered position, said shiver plates being detachable from said floor in response to pressure exerted by debris lodged between said channels and said floor;

(e) a pair of housings inside said bucket to acommodate and protect each said hydraulic cylinder;

(f) a door assembly pivotally attached to said side walls, at a position remote from said open front area adjacent said floor;

(g) a first hydraulic cylinder for moving said bucket from a lowered position to a raised position; and (h) a second hydraulic cylinder for raising and lowering said door.

* * * * *